March 9, 1965 R. F. ARNOLDY 3,172,991
FEEDER FOR WELDS
Filed July 30, 1962 3 Sheets-Sheet 3

Roman F. Arnoldy
INVENTOR.

United States Patent Office 3,172,991
Patented Mar. 9, 1965

3,172,991
FEEDER FOR WELDS
Roman F. Arnoldy, P.O. Box 19527, Houston, Tex.
Filed July 30, 1962, Ser. No. 213,266
9 Claims. (Cl. 219—130)

The present invention relates to new and improved feeders for welding, cladding, overlaying and the like. The present application is a continuation-in-part of my copending application Serial No. 57,525 filed September 21, 1960, now Patent No. 3,060,307, entitled Apparatus and Method for Producing Alloy Welds.

In my previously-mentioned copending application improved apparatus are disclosed and claimed wherein powdered alloy material and an electrode wire for producing an alloy weld are fed and deposited in predetermined proportional quantities on the area to be fusion welded or weld overlayed and the like which provides an alloy weld of a predetermined composition.

A major difficulty in fusion welding or weld overlaying is the provision of alloy welds of uniform composition or analysis. This is due to the difficulty of providing homogeneous mixtures to the work. For example, premixing of metals does not provide homogeneous mixtures to the work because the heavier metal particles settle out, the larger particles rise to the surface and the more angular particles rise to the top in storage, transportation or other movement. The same problem exists in premixing flux material with alloy metal or metals.

It would be highly desirable to provide a feeder which feeds homogeneous mixtures of alloy metals to the work and by which a fusion weld or weld overlay is obtained of uniform composition or analysis and either in open arc, series arc, submerged or shielded welding. It would also be highly desirable to simultaneously feed metals in predetermined portions with the electrode so that accurate, predetermined, homogeneous mixtures and welds are obtained without any special or expenesive processing or premixing of the various metals. It would also be highly advantageous to provide a feeder that simultaneously feeds the weld material and any shielding or flux material to the work so that separate and independent application of shielding gas and submerged type flux materials are unneccesary. The present invention is directed to such a feeder.

It is an object of the present invention to provide a new and improved feeder by which a homogeneous mixture of predetermined proportional amounts of two or more metals are fed to the work simultaneously with the electrode.

Yet a further object of the present invention is the provision of a feeder in which a gas shield is provided simultaneously and automatically with the weld materials to the work thereby eliminating the neccessity of providing separate shielding gas during the welding operation.

Yet a further object of the present invention is the provision of a feeder in which flux material is simultaneously fed along with the weld materials for submerged welding.

Yet a further object of the provision of a feeder in which varying amounts of any of the foregoing are fed simultaneously and proportionately in homogeneous mixtures with the electrode wire feed, which is relatively simple to manufacture and repair and which is efficiently reliable in operation by which all type of alloy welding is accomplished quickly and readily and in which the alloy weld deposited is of a closely-controlled, predetermined, uniform composition.

A further object of the present invention is the provision of such a new and improved feeder which automatically co-ordinates in a single feeding operation the homogeneous mixing and the deposition of alloy powder materials, the deposition of shielding gas materials or flux materials, and an electrode wire to form an alloy weld having a closely-controlled, uniform analysis.

Still a further object of the present invention is the provision of such a new and improved feeder in which the predetermined proportional amounts of two or more particulate welding materials and gas shielding or flux material is fed with a wire electrode to the work by a feeding means driven in response to the feeding of the wire electrode.

A still further object of the invention is the provision of a feeder in which several feeding compartments can be easily and readily secured together to form a unitary feeder for feeding a number of materials to the work simultaneously and in predetermined relationship, yet can be readily detached from one another, if desired, for example, in making adjustment, repairs and the like.

A still further object of the present invention is the provision of a feeder which mixes the alloy weld metals in predetermined amounts into a homogeneous mixture and applies this mixture to the work along with the electrode.

Other and further objects, features and advantages of the present invention will be apparent from the following description of a presently-preferred embodiment thereof, given for the purpose of disclosure, and taken in conjunction with the accompanying drawings, where FIGURE 1 is a side elevational view, partly in section, illustrating a feeder according to the invention, and particularly the wire electrode feeding means and the discharge spout.

FIGURE 4 is a fragmentary, perspective view illustrating means for releasably securing together compartments of the feeder.

Figure 2:
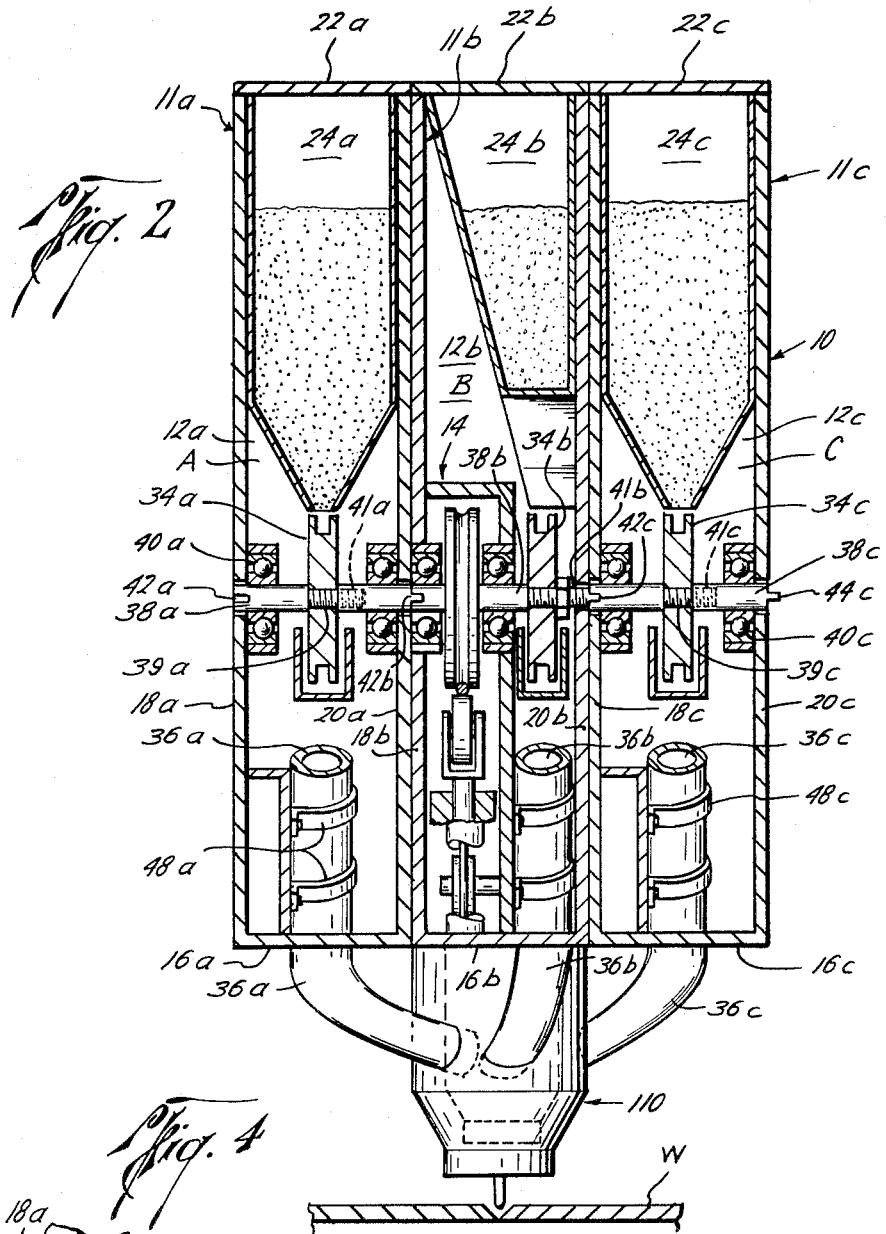
FIGURE 2 is a sectional view taken along the line 2—2 of FIGURE 1 illustrating the relationship between the wire electrode feeding and guiding mechanism and the welding compostion feeding mechanism thereof.

Referring to the drawings and particularly to FIGURE 2, the apparatus includes a supporting housing 10 which is generally formed of the separate bodies 11a, 11b and 11c which provide a plurality of compartments A, B and C.

Of course, if deisred, a single body structure can be utilized and provided with the desired number of compartments. By releasably connecting several body members together, as later described, flexibility and ease in making adjustments, repairs and replacements are obtained.

It is noted that the three body assemblies 11a, 11b, and 11c are substantially the same except that the electrode wire feeding means is incorporated in the body 11b. Accordingly, to simplify the disclosure, and unless indicated to the contrary, the components of the bodies 11a, 11b and 11c are indicated by numerals only in the specification and in the drawings the reference letteis a, b, and c are added to them for the purpose of designating in which body the component is disposed.

Each compartment contains means generally designated as 12 for separately feeding weld material or materials to the work W, here shown as a metal base plate.

The supporting housing or body 12b also includes a wire electrode feeding means, generally designated by the reference numeral 14, for feeding a wire electrode to the work W as later explained in detail. Each feeding means feeds its respective material in proportion to the feeding of the wire electrode to the work W by means of the wire electrode feeding means 14. Thus, predetermined and proportional amounts of various materials utilized in the welding process are simultaneously fed to and deposited on, adjacent or around the weld area in a one pass operation of the feeder.

As previously mentioned, the supporting housing 10, in the form illustrated, is generally made up of three separate housings 11a, 11b and 11c each of which includes the bottom 16, the side walls 18 and 20, and the end walls 22, as best seen in FIGURE 2, providing complete enclosure for each of the compartments A, B and C.

At the top of each compartment A, B, and C, is a hinged door 22 so that the upper portion of each of these compartments can be opened.

Figure 1:
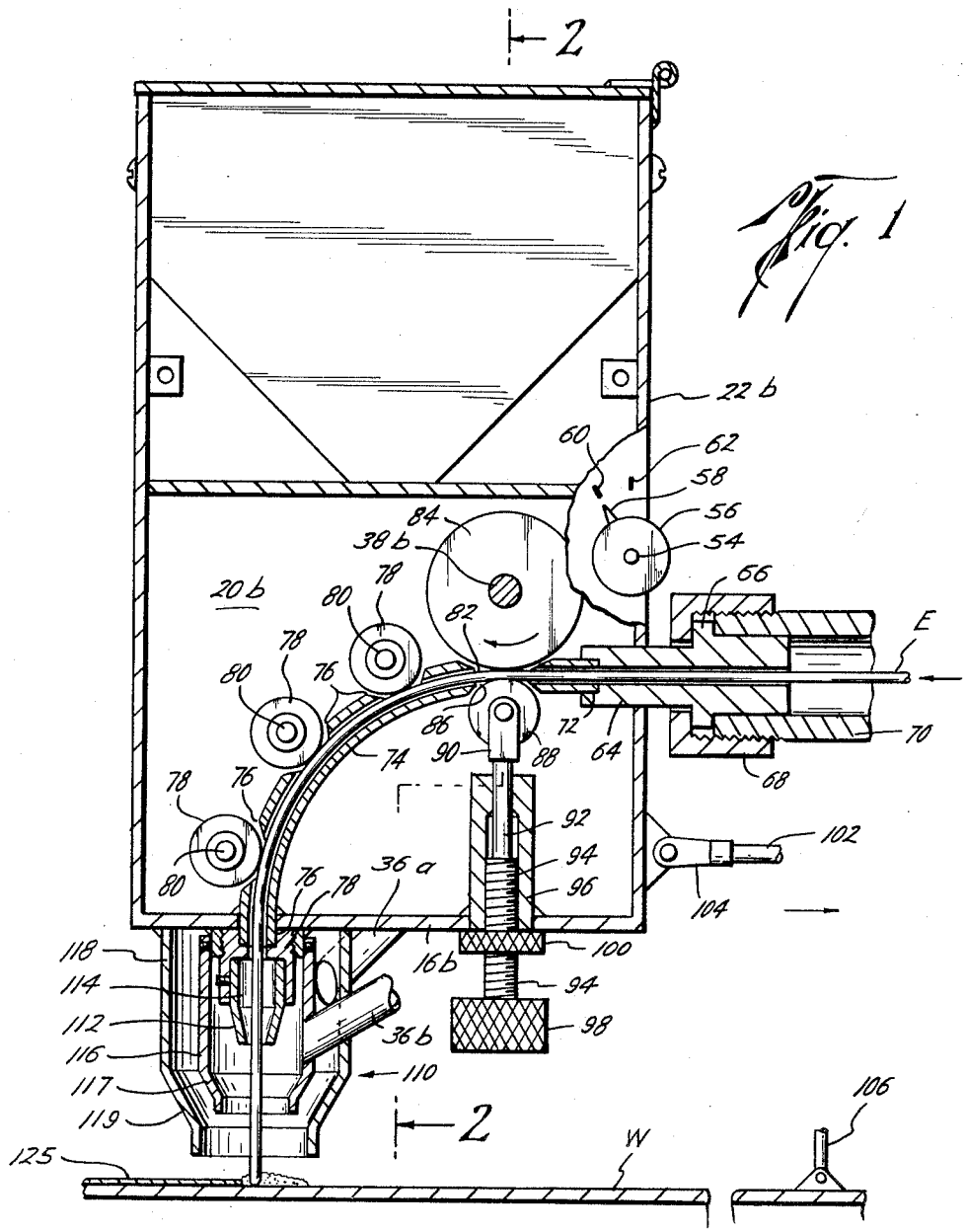

Disposed in the upper end of each compartment A, B and C is a hopper or container 24 into which various welding materials such as alloys, flux, shielding materials and the like are placed by opening the door 22 to that compartment. Thus, for example, in the arrangement illustrated, different alloy welding materials are placed in the containers 24a and 24b and, for submerged welding, flux is placed in the container 24c. As best illustrated in FIGURES 1 and 3, the hoppers or containers 24 are retained in their compartments by means of the screws 25 or by other suitable means.

Figure 3:
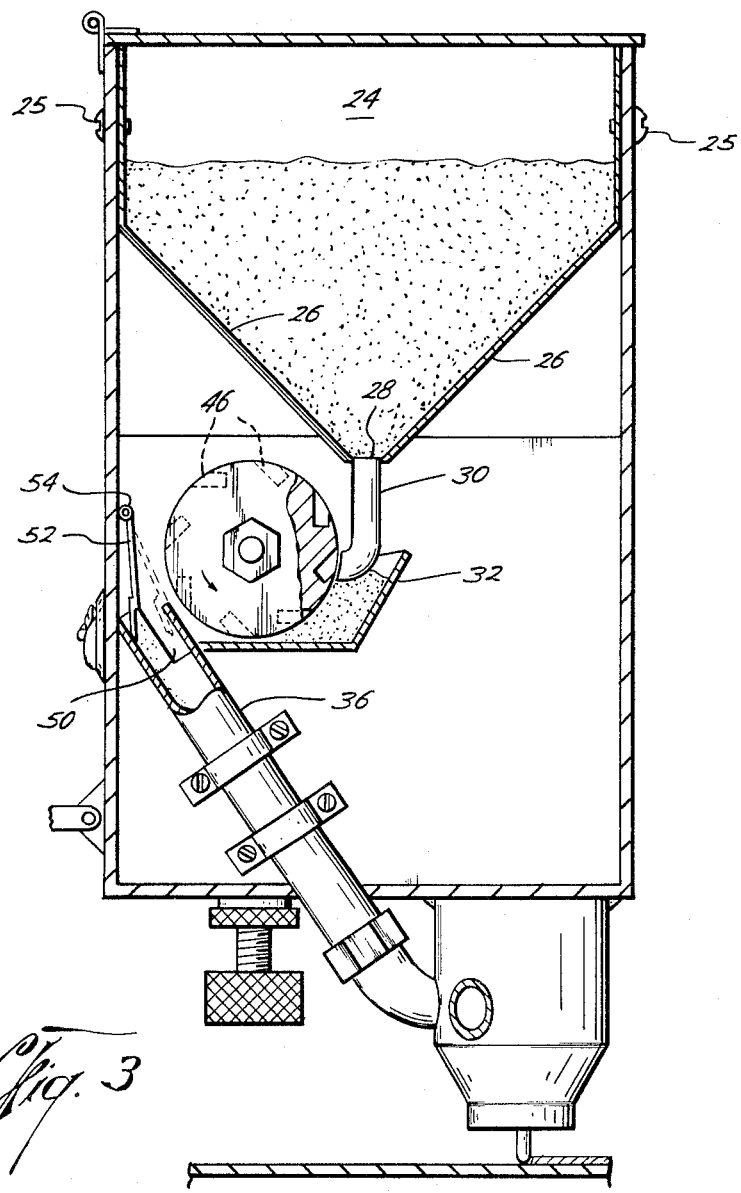
FIGURE 3 is a side view, partly in section and partly in elevation, taken on the line 3—3 of FIGURE 2 illustrating a welding composition feeding means of the feeder.

Referring to FIGURE 3, the lower walls 26 converge downwardly toward the opening 28 leading into the spout 30, which is in the form of a downwardly-extending substantially L shaped tube through which the material in the hopper or container 24 moves to the area therebelow. A cup or collector 32 is welded or otherwise secured in the compartment under the spout 30 to collect any accumulation of the material.

As best seen in FIGURE 2 a feed wheel 34 is provided for feeding the various weld materials in measured and proportional amounts from its cooperating hopper 24 into a flexible tube 36 for providing these materials in predetermined proportionate amounts to the work W as later described.

Each of the feed wheels 34 are mounted on the axles or shafts 38 and are positioned below the respective hoppers or containers 24 and adjacent each of the corresponding spout 30 (FIGURE 3). The shafts or axles 38 are rotatably journaled by means of the antifriction assemblies generally designated by the reference numeral 40 on each of the side walls 18. One end of each of the axles or shafts 38 are slotted as at 42 and the other ends are provided with the projecting keys 44 which interfit in the slots 42 so that the shafts 38 rotate as a unit. Thus, each of the feed wheels 34 rotate simultaneously and the same amount.

As best seen in FIGURE 3, each of the feed wheels 34 is provided with a plurality of recesses or pockets 46 formed in its periphery for feeding the welding composition being fed by its cooperating hopper and spout as previously described. The recesses 46 are preferably inclined at an angle with respect to radius lines passing through the center of each feed wheel 34. The angle of inclination of the recesses or pockets 46 is such that when each wheel 34 rotates counterclockwise as viewed in FIGURE 3, powder or other finely divided materials, such as welding composition, flux, shielding material and the like is picked up by the recesses 46 on the right portion of the wheel 34 and is carried over to the left portion of the wheel 34 for discharging into the flexible tubes 36. In other words, as the recesses or pockets 46 are rotated during the movement of the feed wheel 34, the composition or material is confined in these pockets or recesses 46 during a portion of the travel and is then dumped therefrom. The spout 30 from the hopper 24 is positioned so as to discharge the composition or material adjacent to the periphery of the wheel 34 as the recesses or pockets 46 move past the spout 30 thereby picking up the composition as previously mentioned. Also, the cup or dish 32, previously mentioned, catches any accumulation of this material or composition, so that the pockets or recesses 46 initially pick up some of the material or composition therefrom.

The size, depth and number of the pockets or recesses 46 are predetermined so that a predetermined quantity of material is discharged onto the work, as later described, for each revolution of the feed wheel 34. This is proportional to the amount of material fed to the work by the other feed wheels and, as later described, is proportionate to the amount of wire electrode fed to the work.

As best seen in FIGURE 2, each of the feed wheels 34 is removably disposed on its shaft 38 and is threaded to the reduced threaded portions 39, the outer end of which is threadedly received in the threaded box 41, the other end portion of the shaft 38. Thus, by simply screwing the desired feeder wheel on the desired shaft and placing the desired material in the corresponding hopper or container 24, a predetermined and proportional quantity of welding material is fed to the work area.

Preferably, each of the feeder tubes 36 are flexible, and are rigidly secured by the clamps 48 so that their upper ends extend up to and into the dish like members 32. Preferably, the upper ends of the tubes 36 are each provided with a slot or channel 50, as best seen in FIGURE 3, and a gate 52 is pivotly secured by the pivot pin 54 for closing off the material to the tubes 36, when desired. When the gate is open, however, as illustrated in FIGURE 3, the powdered material from the feeder wheel 34 is deposited into the upper ends of the flexible tubes 36 for deposition to the work area as later described.

Preferably, the pivot pin or pivot shaft 54 extends across each of the compartments A, B and C so that all the gates 52 are opened and closed simultaneously. These shafts are interconnected in the same manner as the shafts 38 or are otherwise releasably secured together so that rotation of the pivot shaft 54 causes rotation of all of the gates 52 of the various compartments assembled together.

For the purpose of opening and closing the gates, and giving an indication thereof, a knurled knob 56 is secured to the pivot shaft 54, as best seen in FIGURE 1, which is provided with the pointer 58 which points to the marks 60 and 62 on the outer portion of the body mmeber 10 to give an indication as to whether or not the gates are in an open or closed position.

Referring again to FIGURE 3, it is noted that the gate 52 shown in solid lines is in an open position, and shown in dotted lines in a closed position. In closed position it engages the lower wall of the cup or dish 32 so that any material which is picked up by the pockets 46 in the metering feed wheels 34 is returned to the cup or dish 32 when the gate 52 is closed. Thus, only predetermined metered amounts of material are deposited in the tube or conduit 36 and thus applied to the work W.

Referring now to the wire electrode feeding mechanism 14, and with particular reference to FIGURE 1, this mechanism is located in the body portion, the parts of which are indicated by the reference letter b, and includes a generally cylindrical sleeve 64 which extends through the wall 22b of the compartment B through a suitable opening and is welded or otherwise suitably secured thereto as shown. The sleeve 64 has a suitable axial bore through which the wire electrode E movably extends and passes. An annular flange 66 is provided on the cylindrical sleeve 64 externally of the wall 22b, which serves as a stop member for the internally threaded coupling member 68 which threadably receives the end of the support tube or pipe 70 as illustrated. The support tube or pipe 70 in normal use is connected to a semi-automatic welding machine, or an automatic welding machine, so that the entire apparatus is supported on the welding apparatus (not shown). The support tube or pipe 70, and in such event coupling member 68, may be omitted and not employed for supporting the feeder, and any other type of support may be used such as a handle which is grasped by the operator, or the apparatus may be supported by overhead suspension means, such as a cable and the like.

The internal end of the guide sleeve 64 is provided with a recess or counterbore 72 into which is secured by welding or other means a curved guide tube 74. The tube 74 generally curves about 90°. The lower ends thereof extend through the lower plate member 18b and is rigidly secured into the counterbored portion or recess 76 of the nozzle member 78.

The tube 74 serves to guide the wire electrode E and change its direction of movement from a generally horizontal one to a generally vertical one as it is fed to the work W to be welded or weld coated. The guide tube 74 has a plurality of openings 76 adjacent its upper portion which are formed therethrough at intervals which receive the guide and bending wheels 78. Such wheels or rollers 78 may be mounted in any suitable way, but preferably are mounted on the axles 80 which are threaded or otherwise suitably connected to the vertical frame member 20b.

In addition to the series of openings 76, the guide tube 74 has an enlarged opening 82 for receiving a contact drive wheel or roller which contacts the upper portion of the wire electrode E. An additional opening 86 is provided below the opening 82 which receives an adjustable contact wheel or roller 88 which engages the wire electrode E directly below the driving contact wheel 84 so that the wire electrode E is maintained in firm engagement with the driving wheel 84 so that rotation of the driving wheel in turn causes a corresponding movement of the wire electrode E.

The contact wheel or roller 88 preferably is adjustably mounted. To this end, it is mounted on a yoke 90 which is formed integrally with or otherwise suitably secured to the upper end of the shaft 92 which is mounted in engagement with but separate from a lower threaded adjusting rod 94 threadedly received in the nut or sleeve 96 welded or otherwise rigidly secured to the bottom member 18b. Thus, by rotation of the knurled knob 98 the upper end of the threaded shaft 94 is moved upwardly and downwardly, which in turn moves the shaft 92 and the contact wheel 88 thereby adjusting the space between the driving roller wheel 84 and the contact roller wheel 88. The upper shaft 92 is non-rotatably mounted through the nut 96 so that the contact wheel 88 remains in the position illustrated as it is moved upwardly and downwardly by movement of the threaded rod 94. A lock nut 100 is provided on the threaded shaft 94 for locking the shaft 94 and therefore the contact roller 88 in the desired position.

The electric current for the wire elcetrode E is supplied through an electrical conductor 102 which is connected to the housing member 22b by any suitable means such as the clamp 104. The electrical circuit to the wire electrode E is completed by another electrical conductor 106 which is secured to the work W which is being welded. For the convenience of disclosure, details of the electric circuit to the wire electrode E from the conductor 102 have been omitted. Both of the conductors 102 and 106 extend to the welding machine (not shown) which provides for the automatic or semi-automatic welding.

Referring now to the details of the nozzle or discharge spout construction, the discharge spout is generally indicated by the reference numeral 110 and is formed of a plurality of generally concentric compartments through which the wire electrode E is fed, one or more metals are fed and, in the event of submerged welding, a flux is fed, or in gas shielding, a shielding material is fed simultaneously to the work W in metered proportional amounts.

In the form of the discharge spout 110 shown in the drawings, and with reference to FIGURE 2, it includes an inner member 112 which is secured to the counter- bored nut 78 and which is provided with the bore 114 which constitutes a continuation of the passage in the guide tube 74 so that the wire electrode E is fed and directed downwardly on to and deposited on the work W in a generally vertical position as illustrated. A first generally annular chamber is formed about the electrode nozzle 112 by means of the generally annular nozzle member 116 which has the inwardly and downwardly converging lower end 117 into which the lower ends of the tubes 36a (FIGURE 2) and 36b extend so that the material being discharged into these are discharged in metered amount in the annular chamber formed by the nozzle or spout member 116.

Still an additional compartment or chamber is formed by the annular nozzle or spout member 118 which is disposed about and surrounds the annular nozzle or spout member 116 and which has a corresponding downwardly and inwardly converging portion 119 adjacent its terminal end. In this outer nozzle member 118, the tube 36c is secured so that the material from this tube is discharged into the annular compartment formed by the outer tubular member 118 and the inner tubular member 116. The tubes 36a, b and c, of course, may be releasably or rigidly secured into the walls of the particular nozzle members forming the chambers into which they are to discharge their contents, as desired. The tube 36b, of course, passes through the outer tubular nozzle member 118. Thus, flux or gas shielding material is deposited about the work as the welding progresses for either submerged or shielded welding.

Thus, the material in the various containers is fed by the feeding mechanism into the tubes 36a, b and c into the multicompartment nozzle or discharge spout 110 so that all of the material utilized in the welding or coating operation is provided simultaneously in metered proportional amounts, as desired. Thus, advantageously, the desired material or materials, with or without flux or shielding, is deposited simultaneously in the vicinity of the weld automatically and in proportionally-metered amounts, yet without any separate pre-mixing of materials being required by which welds or overlays of closely-controlled analysis are provided.

The multiple feeder may be made up of any number of compartments or feeding units, as desired, and, for this purpose, means are provided for releasably securing the bodies 12a, b and c together. Preferably, these members are releasably secured together and to this end, and with reference to FIGURE 4, the nuts 120a, b and the like are provided at the lower and upper ends (not shown) of the individual units 12a, b and c, through which the screws, such as that indicated by the reference numeral 122b are threaded to releasably secure these units together. Thus, as many of these individual units may be secured together as desired with their corresponding discharge tubes 36 being disposed in the appropriate place in the nozzle 110 so that a plurality of individually and separately metered and proportional amounts of weld materials are simultaneously provided to the nozzle or discharge spout 110 and deposited on the work in proportion to the rate of deposit of the wire electrode. Of course, if desired, the feeder may be formed in a single unit rather than securing together a plurality of them.

As previously mentioned, however, when a plurality of these units are secured together, the axles or shafts 38 are connected together as described as are the gate axles 54. Thus, it is a simple and quick matter to assemble the desired number of feeder units.

In the operation of this multiple feeder, the desired constituents or components of the final weld or overlay 70 on the work W is determined in advance. These constituents are then provided by placing them in the hoppers 24a, b and c, for example, assuming that the multiple feeder is to be used for a submerged welding or cladding operation in which it is desired to have the composition of the weld or overlay 125 formed of a predetermined percentage of two alloy constituents and the wire, the powdered welding constituents are separately placed in the hoppers 24a and 24b and the flux is placed in the hopper 24c. The metering feeder wheels 34a, b and c then feed predetermined amounts of weld alloy constituents to the nozzle 110 along with a predetermined amount of flux which covers and thus submerges the welding operation. Thus, as the wire electrode E is fed to the work W at a predetermined rate, this drives the driving wheel 84 which in turn drives the metering material feeding wheels 34a, b and c which causes a corresponding, simultaneous and proportioned amount of the welding materials to the work as the wire electrode is melted. Thus, a predetermined and proportionate amount of materials is deposited and forms the composition of the final weld or overlay in closely controlled proportions or analysis.

Thus, for example, if the wire electrode E is fed to the work W during the welding procedure at a rate of one ounce per minute or other increment of time, then the welding compositions in the hoppers 24a and b are fed to the work W so that one ounce of each such composition or such other amount calculated to be necessary for the final analysis in the weld 125 is fed to the work W for each minute or increment of time. Additionally, a desired amount of flux from the hopper 24c is also fed which submerges the welding operation.

When the wire electrode E is fed continuously, the weld compositions from the hoppers 24a and b are also fed continuously since the movement of the drive wheel 84 is rotated by the feeding movement of the wire electrode E, which in turn causes a corresponding movement of the feed wheels 34a, b and c. These feed wheels, of course, pick up the compositions in their pockets as previously described. Thus, since the size and number of the pockets 46 in a particular feed wheel 34a, b or c are fixed, a predetermined amount of welding materials is fed to the work W in direct proportion to the rate of movement of the wire electrode E. Also, as previously mentioned, the feed wheels may be of different size, may have different sizes and numbers of pockets for feeding different proportionate amounts of the weld composition to the work W so as to obtain a predetermined final analysis of the weld or overlay 125.

Of course, if desired, predetermined mixtures of weld alloy materials may be utilized and fed to the work by the multiple feeder; however, as previously mentioned, advantageously it is unnecessary to premix various weld alloy materials in predetermined amounts, this being accomplished by the multiple feeder.

While the known types of semi-automatic and automatic welding equipment control the rate of feeding of the wire electrode E, which moves it through the multiple feeder, which in turn drives the driving wheel 84, if desired, power can be supplied to drive the drive wheel 84 to cause movement of the electrode wire E through the feeder instead of depending upon the feeding from the semi-automatic or automatic welding equipment. In either event, the drive wheel 84 transmits the movement thereof to the feed wheels 34a, b and c in response to the feeding movement of the wire electrode E through the multiple feeder 10.

The multiple feeder of the present invention may be used in any type of fusion welding or weld overlaying and in open arc, series arc, submerged and shielded welding and the like.

The present invention, therefore, is well suited and adapted to attain the objects and ends and has the advantage and features mentioned as well as others inherent therein.

While a presently-preferred embodiment of the invention has been given for the purpose of disclosure, changes may be made therein which are within the spirit of the invention as defined by the scope of the appended claims.

What is claimed is:

1. A multiple feeder for use in welding comprising:
   (a) a plurality of containers for particulate weld material,
   (b) a discharge spout provided with a generally central passage and a chamber about the passage,
   (c) electrode directing means directing an electrode through the passage,
   (d) feed means for each of the containers feeding the particulate weld material from the containers to the chamber whereby the electrode and the particulate material are simultaneously fed to the work area, and
   (e) means coordinating the rate of feeding of the electrode directing means and the feed means whereby metered proportionate amounts of the electrode and from each of the containers the particulate weld material are simultaneously fed to the work area.

2. A multiple feeder for use in welding comprising:
   (a) a plurality of particulate weld material containers,
   (b) a discharge spout provided with a generally central passage and at least one chamber about the passage,
   (c) electrode directing means directing an electrode through the passage,
   (d) separate feed means each arranged to deliver predetermined amounts of particulate material from each of the containers to the chamber, and
   (e) means coordinating the rate of feeding of the electrode directing means and each of the separate feed means whereby predetermined proportionate amounts of the electrode and predetermined proportionate amounts of the particulate welding material from each of the containers are simultaneously fed to the work area.

3. A multiple feeder for use in welding comprising:
   (a) a discharge spout provided with a passage for feeding an electrode to the work area and including feed means for feeding particulate weld material to the work area,
   (b) a plurality of containers for the particulate weld material,
   (c) separate passage means connected to the feed means, and,
   (d) a pair of metering feed wheels, one each of said feed wheels arranged to feed a metered amount of the weld material from one each of said containers to one each of said passage means whereby the electrode and the particulate weld material are simultaneously fed to the work area.

4. A multiple feeder for use in welding comprising:
   (a) at least a pair of body members,
   (b) a weld material container in each body member,
   (c) means in each body member arranged to feed metered amounts of the weld material from the container to the work area,
   (d) said last mentioned means including interfitting parts when the body mambers are secured together coordinating said means,
   (e) and means releasably connecting the body members together.

5. A multiple feeder comprising:
   (a) a plurality of body members,
   (b) a weld material container in each body member,
   (c) passage means in each body feeding weld material from the container to the work area,
   (d) axles rotatably disposed in each body member, said axles being axially-aligned when the body members are secured together,
   (e) interfitting end portions non-rotatably securing said axles together when the body members are secured together, whereby said axles rotate as a unit, and
   (f) a metering feed wheel on each of said axles arranged to feed metered amounts of the weld material from the containers into the passage means whereby metered proportional amounts of the weld material are simultaneously fed to the work area.

6. A multiple feeder comprising:
(a) a plurality of body members,
(b) a container in each body member,
(c) a passage means in each body feeding weld material from the container to the work area,
(d) axles rotatably disposed in each body member, said axles being axially-aligned when the body members are secured together,
(e) interfitting end portions non-rotatably securing said axles together when the body members are secured together whereby said axles rotate as a unit,
(f) a metering feed wheel on each of said axles arranged to feed metered amounts of the weld material from the container into the passage means whereby metered proportional amounts of the weld material are simultaneously fed to the work area, and
(g) electrode directing means including an electrode wheel disposed on one of the axles for directing an electrode to the work area with the weld material.

7. A multiple feeder comprising:
(a) a plurality of body members,
(b) means releasably connecting the body members together,
(c) a container in each body member,
(d) a discharge spout provided with a generally central passage and at least one chamber disposed about the passage,
(e) passage means in each body member arranged to convey the weld material in each container to the chamber in the discharge spout,
(f) an axle journaled in each body member, axially-aligned with respect to each other,
(g) interfitting end parts non-rotatably securing the axles together whereby they rotate as a unit,
(h) a metering feed wheel on each axle arranged to feed metered amounts of weld material from its co-operating container into its passage means,
(i) electrode feeding means in one of the body members feeding an electrode through the passage in the discharge spout, and
(j) a wheel on the axle in one of the body members arranged to engage the electrode whereby rotation of the axles is coordinated with movement of the electrode whereby proportional metered amounts of the weld material and the electrode are simultaneously fed to the work area.

8. A multiple feeder for use in welding comprising:
(a) a plurality of hoppers for particulate weld material,
(b) feed means for feeding the particulate weld material from each of the hoppers to the work area,
(c) electrode feeding means for feeding an electrode to the work area,
(d) means metering the amount of the weld material fed from each of the hoppers and metering the amount of the electrode fed to the work area, and
(e) means coordinating the means metering the amount of weld material fed from each of the hoppers and the electrode whereby proportional metered amounts of the electrode and the particulate weld material are fed to the work area.

9. A multiple feeder for use in welding comprising:
(a) a plurality of particulate weld material containers,
(b) a discharge spout provided with a generally central passage and a plurality of concentric chambers disposed about the central passage,
(c) electrode directing means directing an electrode through the passage,
(d) separate feed means, each of said separate feed means including,
   (1) a metering feed wheel arranged to feed the particulate weld material from its corresponding container,
(e) passage means arranged for feeding of the particulate weld material from each of the metering feed wheels to the chambers, and
(f) means coordinating the rate of feeding of the electrode directing means and each of the feed wheels whereby the electrode and the particulate weld material from each of the containers are simultaneously fed to the work area in metered proportionate amounts.

References Cited in the file of this patent
UNITED STATES PATENTS

| | | |
|---|---|---|
| 783,186 | Ericsson | Feb. 21, 1905 |
| 1,358,747 | Jones | Nov. 16, 1920 |
| 1,621,307 | Benzel | Mar. 15, 1927 |
| 2,727,125 | Muller | Dec. 13, 1955 |
| 2,927,990 | Johnson | Mar. 8, 1960 |
| 3,060,307 | Arnoldy | Oct. 23, 1962 |